United States Patent
Baylog et al.

(10) Patent No.: US 10,109,060 B1
(45) Date of Patent: Oct. 23, 2018

(54) UNCERTAINTY PREDICTION IN PASSIVE TARGET MOTION ANALYSIS

(71) Applicants: John G Baylog, Tiverton, RI (US); Russell Costa, Portsmouth, RI (US)

(72) Inventors: John G Baylog, Tiverton, RI (US); Russell Costa, Portsmouth, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 426 days.

(21) Appl. No.: 15/152,696

(22) Filed: May 12, 2016

(51) Int. Cl.
| | |
|---|---|
| G06T 7/20 | (2017.01) |
| G06T 7/60 | (2017.01) |
| G06N 7/00 | (2006.01) |

(52) U.S. Cl.
CPC .............. *G06T 7/20* (2013.01); *G06N 7/005* (2013.01); *G06T 7/60* (2013.01); *G06T 2207/20076* (2013.01)

(58) Field of Classification Search
CPC ... G06T 7/20; G06T 7/60; G06T 2207/20076; G06N 7/005
See application file for complete search history.

(56) References Cited

U.S. PATENT DOCUMENTS

| | | | | |
|---|---|---|---|---|
| 5,581,490 A | * | 12/1996 | Ferkinhoff | G01S 11/14 702/181 |
| 5,777,948 A | * | 7/1998 | Ferkinhoff | H04B 11/00 367/124 |
| 7,020,046 B1 | | 3/2006 | Baylog | |

OTHER PUBLICATIONS

Baylog et al.; Uncertainty Prediction in Passive Target Motion Analysis; May 12, 2016; pp. 31; http://www.dtic.mil/dtic/tr/fulltext/u2/1027001.pdf (Year: 2016).*

* cited by examiner

*Primary Examiner* — Daniel Pihulic
(74) *Attorney, Agent, or Firm* — James M. Kasischke; Michael P. Stanley

(57) ABSTRACT

A method for target motion analysis for calculating the track between an observer and a target and estimating its uncertainty includes initializing strongly observable state components into strong state vectors and weakly observable state components to form a weak state analysis grid. Initial probability density functions are calculated from all components. The method then iteratively calculates strong state gradients, target track direction, and updates strong state vectors over the analysis grid. Probability density functions are recalculated. Calculations are reiterated if the probability density functions change more than an information threshold. The strong state vectors and weak state probability density functions are provided as output if the information threshold is not exceeded.

6 Claims, 4 Drawing Sheets

UNCERTAINTY PREDICTION IN PASSIVE TARGET MOTION ANALYSIS

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION

(1) Field of the Invention

The present invention is directed to a target motion analysis system and method and more particularly to a target motion analysis system that indicates uncertainty.

(2) Description of the Prior Art

In the bearing only target motion analysis (TMA) problem, one must estimate the position and velocity of a constant velocity target from bearing observations. FIG. 1 shows use of a target motion analysis system. A target 10 is positioned at an unknown location and following an unknown course relative to an observer 12. Observer 12 has a sensor array such as a passive sonar or radar array 14 that can receive a signal radiating from target 10. Observer 12 also has environmental sensors 16 and a database 18. Array 14, sensors 16, and database 18 are all connected to a processor 20. User input 22 can also be provided to processor 20. Processor 20 is capable of beamforming data from the sensor array 14 in order to provide bearings from the observer 12 to the target 10. Processor 20 can also utilize information from the array 14, database 18, user input 22 and/or environmental sensors 16 to provide an estimate of the bearing and range to target 10.

The target motion analysis system 24 receives information from processor 20 to provide a TMA solution. This solution is comprised of parameters such as the range, bearing, course and speed of the target. The target motion analysis system 24 can be a routine implemented on processor 20. The solution is provided for display on a suitable display device or for use by other systems.

As shown in FIG. 2, target range R and bearing B define the position of the target 10 relative to that of the observer 12, and target course C and speed S define the velocity of the target 10 as it transits through the space. Target state is defined as $\bar{x}(t)=[x(t),y(t),\dot{x},\dot{y}]^T$, where $x(t)$ and $y(t)$ are Cartesian coordinates of the target with respect to time, and $\dot{x}$ and $\dot{y}$ are components of the target velocity.

As is well known, a fundamental property of bearings-only target motion analysis (TMA) is that bearing B to the target 10 results directly from sensor system output, but the range R to the target 10 must be inferred from additional data. This additional data can be obtained by maneuvering the observer 12 having the sensor system. A single-leg of observer motion only provides a partial target motion solution. (A leg is defined as a time interval of constant platform velocity.)

In addition to a point estimate of the current target state, a representation of the resulting uncertainty in the solution is required. The positional uncertainty is usually defined by an area of uncertainty (AOU) about the target 10 shown as dashed line 28. Uncertainty characterizations regarding other parameters may be required as well. For example, the uncertainty related to target velocity, comprised of the target's course and speed, can also be indicated.

Observations of contact state are imperfect. This can be modeled by representing the observation as a mapping from the true contact state corrupted by additive noise.

$$z_m = B_m(\bar{x}(t_m)) + \eta_m \tag{1}$$

where $\bar{x}(t_m)$ denotes the target state at time $t_m$ from which the estimated bearing, $z_m$, is measured as a function of the true bearing, $B_m(\bar{x}(t_m))$. The observation error, $\eta_m$, is assumed to be independent and identically distributed over the ensemble of observations, $\eta \sim N(0,\sigma^2)$, with $\sigma$ denoting the standard deviation of the error. An estimate of the target state, $\hat{x}$, can be developed by processing a collection of observations, $Z=[z_1, z_2, \ldots, z_M]$, using any of a number of commonly accepted estimation methods. For an estimated target track to be considered plausible, it must fit the data reasonably well. A standard measure of the goodness-of-fit is the sum squared error, $$J(\hat{x}) = \sum_{m=1}^{M} (z_m - \hat{z}_m)^2. \tag{2}$$

The mathematical relationships denoting dynamic vehicular motion and the mapping between target states and the measurements used to estimate them are often non-linear. This is true for the bearing observation:

$$B_m = \tan^{-1}\left(\frac{r_x(t_m)}{r_y(t_m)}\right) \tag{3}$$

where $$r_x(t_m) = x(t_m) - x_0(t_m) \tag{4}$$

$$r_y(t_m) = y(t_m) - y_0(t_m) \tag{5}$$

with $(x, y)$ and $(x_0, y_0)$ denoting the coordinates of the target and the observer at time $t_m$. Hence, direct analytical expressions for estimated values cannot always be obtained and iterative estimation processes must be developed in order to converge to an acceptable solution. One such method applies a Gauss-Newton approach to the iteration process. For these types of algorithms, the state vector estimated is adjusted with each iteration by an amount proportional to the change in cost function, as in equation 2, that is dictated by the gradient at the current estimate. This iteration takes the form $$\hat{x}_{i+1} = \hat{x}_i + s \cdot g_i \tag{6}$$

where i denotes the iteration number and s denotes a scale factor referred to as the step-size. When the measurement error over a batch of data can be assumed to be independent and identically distributed, a Gauss-Newton approximation to the cost function $g_i$ will yield the vector equations:

$$g_i = [A^T A]^{-1} A^T (Z - \hat{Z}) \tag{7}$$

where A denotes an (M×N) gradient matrix of partial derivatives defining the change in measurement with the change in state, $$A = \left[\frac{\partial z_m}{\partial x_n}\right], \quad (8)$$

for m=1, ..., M measurements and n=1, ..., N state vector components.

One standard approach to solve for the vector $g_i$ is to apply the Householder transformation in equation 7 to reduce the solution to a back substitution process. The Householder denotes an orthogonal, idempotent transformation of a vector in its native coordinates onto a coordinate system with a single non-zero component. When applied to a matrix, it is only the first column that is reflected to a single entry basis. Hence, the transformation is applied sequentially until each component of the state vector has gone through a reflection process. The combined transformation yields a transformation matrix, T, with the property that $T^T T = I$, the N-dimensional identity matrix. This transformation matrix T is not actually calculated, only the result of the transformation is calculated. When applied to gradient matrix A, the result is a partition into a non-zero upper triangular square matrix R and a remaining component comprised of zero values.

$$TA = \begin{bmatrix} R \\ 0 \end{bmatrix}, \quad (9)$$

Assuming A is non-singular (i.e., that all the components of $\hat{x}$ are observable from the data), then application of the Householder transformation into equation 7 yields the back substitution equation:

$$g_i = [A^T T^T TA]^{-1} A^T T^T T(Z-\hat{Z}) = R^{-1} R^{-T} R^T \hat{Z}_e = R^{-1} \hat{Z}_e \quad (10)$$

The error vector $\hat{Z}_e$ denotes the first n components of the result obtained by applying transformation T to the residual vector $T(Z-\hat{Z}) = [\hat{Z}_e \hat{Z}_r]$. The upper triangular nature of the matrix R means that the components $g_i$ can be solved for sequentially via a back substitution. Iteration in $\hat{x}_i$ continues until the improvement in $J(\hat{x})$ becomes insignificant in the applied termination criterion.

In many state estimation problems, the representation and visualization of uncertainty in state estimates is a significant part of the estimation process. In the case of Kalman filter and its many extensions, the uncertainty of states is assumed to be Gaussian. While this is useful computationally, it is very often inadequate for characterizing the accuracy of estimates when data quality is low and the estimation problem is nonlinear. In recent years, alternatives have been developed. Unscented Kalman filter have improved uncertainty characterization. Particle filters have addressed this issue by calculating the uncertainty numerically through the ensemble of states represented by the particles. These particles can then be projected to lower dimensional spaces to illustrate the uncertainty to an end user. However, particle representations of uncertainty can be very expensive computationally.

Another alternative are purely grid based methods which consider a discrete subset of the state space as potential solution and then produce error surfaces at the prescribed resolution. If well-conceived, grid based approaches can allow an efficient view of state uncertainty, even with some of the parameters being unobservable. In the case of bearings-only target motion analysis the Parameter Evaluation Plot (PEP) is one example of such a grid-based approach. U.S. Pat. No. 7,020,046 discloses one version of this method and is incorporated herein. The PEP algorithm utilizes the endpoint coordinate system defining the position of the target relative to the observer at each of two times. The base algorithm has been a standard method for target motion analysis (TMA) for many years and various approaches have been applied to improve it. This is shown in FIG. 3 where $B_1$ and $R_1$ denote the bearing and range from observer 12A to the target 10A at time $t_1$, and $B_2$ and $R_2$ denote the bearing and range from observer 12B to target 10B at time $t_2$ as indicated in FIG. 3. Between times $t_1$ and $t_2$, observer 12A has traveled over the path shown at 16. Assuming constant direction and velocity for target 12A gives the estimated path 18 over the same time period. For bearings only estimation in endpoint coordinates, $\hat{x} = [\hat{B}_1, \hat{R}_1, \hat{B}_2, \hat{R}_2]$ must be determined. The position of the target 10 relative to the observer 12 at arbitrary time $t_m$ is given by:

$$r_x(t_m) = \Delta T_1 R_1 \sin(B_1) + \Delta T_2 R_2 \sin(B_2) + x_0(t_m) \quad (11)$$

$$r_y(t_m) = \Delta T_1 R_1 \cos(B_1) + \Delta T_2 R_2 \cos(B_2) + y_0(t_m) \quad (12)$$

Here $\Delta T_1 = (t_2 - t_m)/\Delta T$ and $\Delta T_2 = (t_m - t_1)/\Delta T$ denote the time displacement between the times that the observations are made and the respective endpoint timelines, normalized by the time interval between the timelines, $\Delta T = (t_2 - t_1)$. The observer displacements:

$$\Delta x_0(t_m) = \Delta T_2 x_0(t_1) + \Delta T_1 x_0(t_2) - x_0(t_m) \quad (13)$$

$$\Delta y_0(t_m) = \Delta T_2 y_0(t_1) + \Delta T_1 y_0(t_2) - y_0(t_m) \quad (14)$$

denote deviations of the observer trajectory from a straight line between the observer positions at the respective time lines. Hence the bearing relation expressed in endpoint coordinates becomes $$B_m = \tan^{-1}\left(\frac{\Delta T_1 R_1 \sin(B_1) + \Delta T_2 R_2 \sin(B_2) + x_0(t_m)}{\Delta T_1 R_1 \cos(B_1) + \Delta T_2 R_2 \cos(B_2) + y_0(t_m)}\right). \quad (15)$$

When the endpoint bearings $B_1$ and $B_2$ are assumed to be known and fixed values can be assigned to them, the PEP estimation problem reduces to two-dimensional search for the best $R_1$ and $R_2$ tracking parameters. In this case, the goodness-of-fit can be evaluated directly over the endpoint range parameter space. Goodness-of-fit is measured according to the RMS performance criterion given by:

$$\text{RMS}(\hat{x}) = \sqrt{\frac{1}{N} J(\hat{x}_i)}. \quad (16)$$

This approach is intuitive in that it considers fixed values for directly observed states and calculates the cost function over a gridded sampling of the unobserved states. The resultant cost function, shown in FIG. 4, illustrates a two-dimensional slice of the higher dimensional cost function. The problem with this approach is that choosing the fixed values can be complicated with no single set of values being representative over the whole state space. That is, the selection of two observed values is sensitive to the accuracy of the observations. Generalized statements can be made about FIG. 4. Due to practical constraints, extreme range variations between ranges $R_1$ and $R_2$ are unlikely resulting in a high cost function near the axis. A low cost function is given by intermediate low ranges with little variation since these smaller range changes are more plausible.

SUMMARY OF THE INVENTION

It is a first object of the present invention to provide a bearings-only target motion analysis method.

Another object is to provide such a method that accurately expresses the uncertainty caused by weakly observable parameters.

Yet another object is to provide such a method that uses likelihoods to compute target motion and uncertainty in an efficient manner.

Accordingly, there is provided a method for target motion analysis for calculating the track between an observer and a target includes initializing strongly observable state components into strong state vectors and weakly observable state components to form a weak state analysis grid. Initial probability density functions are calculated over the weak state grid using strong state components. The method then iteratively calculates strong state gradients, target track direction, and updates strong state vectors over the analysis grid. Probability density functions are recalculated. Calculations are reiterated if the probability density functions change more than an information threshold. The strong state vectors and weak state probability density functions are provided as output if the information threshold is not exceeded.

BRIEF DESCRIPTION OF THE DRAWINGS

Reference is made to the accompanying drawings in which are shown an illustrative embodiment of the invention, wherein corresponding reference characters indicate corresponding parts, and wherein.

DETAILED DESCRIPTION OF THE INVENTION

The method provided herein develops a more robust target motion analysis solution estimate and provides an improved characterization of uncertainty in tracking parameter estimates. The method operates over a tensor product space. Our general assumption is that the state space can be partitioned into two components (or subspaces). One part of the state space, $S_s$, corresponds to those state components that are strongly observable. Over this subspace, parameter estimates can be readily obtained via gradient based estimation methods such as steepest descent, Gauss-Newton and Newton-Raphson. In the other part of the state space, $S_w$, the state vector components are considered only weakly observable. For these, applying gradient based estimation methods can be problematic with regard to gradient stability and algorithm convergence. The method herein treats the strongly observable states as continuous random variables in $S_s$ while the weakly observable states are represented by a collection of discrete samples distributed over the subspace $S_w$. The tensor product space comprises the cross product of these continuous and sampled variables $S = S_s \otimes S_w$. The method herein utilizes a non-linear estimation algorithm that jointly exploits gradient based and direct search estimation methods in a manner that provides a robust algorithmic stability while expediting the convergence rate of the algorithm.

Figure 5:
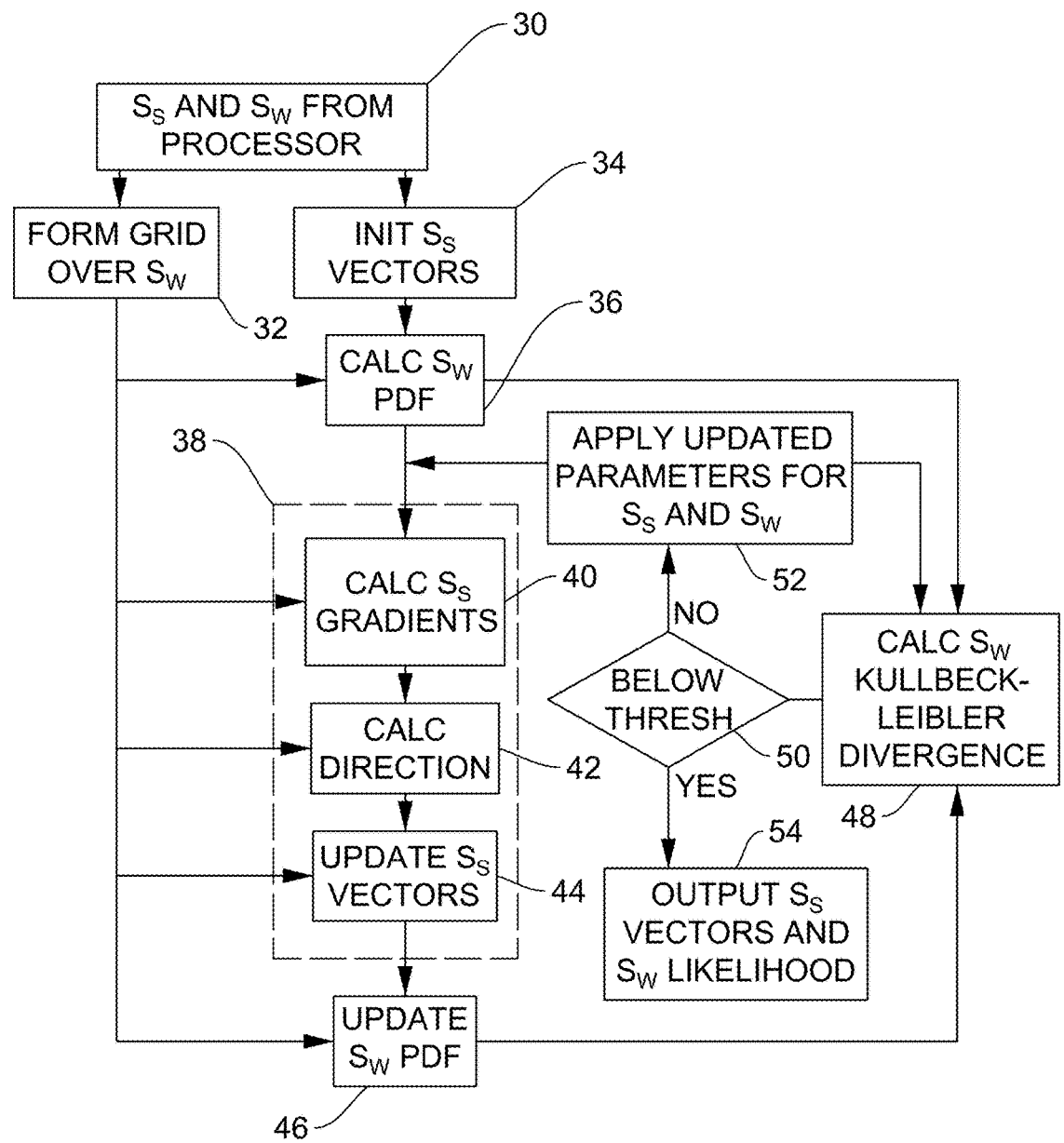
FIG. 5 is a block diagram of the target motion analysis method.

This method generates an efficient and informative uncertainty representation for visualizing solution (state) sensitivity over the weakly observable states. A depiction of the general approach of the invention is depicted in FIG. 5. For general application, the modeling paradigm might include additional parameters whereby unknown modeling parameters, $\overline{m}$, are adjoined to the strongly observable state components, $\overline{x}_s$, such that for each weakly observable state component $\overline{x}_w^k$, $k=1, 2, \ldots, K$, the vector $\tilde{x}^k = [\overline{x}_s^k, \overline{m}]$ that minimizes the performance index is determined. Conditioning on the weakly observable states improves the efficiency of the estimation process. It is assumed that any modeling parameters $\overline{m}$ that are adjoined to the strongly observable states, $\overline{x}_s$, will yield an estimation vector $\tilde{x}$ of dimension $\tilde{N}$ that remains strongly observable such that gradient based estimation methods remain applicable.

Parameter estimates of $\tilde{x}^k$ are formed for each weak state sample point by applying the non-linear gradient based estimation methods to the observation data Z. This provides a stable mechanism for maximizing the goodness-of-fit to the observed data at each of the sample points. As a consequence, parameter estimates of $\tilde{x}^k$ will vary across the set of sample points, $\tilde{x}^k$. In this way, the plausibility of each of the sample points is maximized. These estimates are then used to develop a measure of the uncertainty over the weakly observable subspace $S_w$.

When our improved estimation method is applied to the endpoint coordinate system without any additional modeling parameters, the endpoint bearings constitute the strongly observable states, $\overline{x}_s = [B_1, B_2]$, as tiedown bearings are directly observable. The standard approach to the PEP algorithm is to adopt measured bearings at the prescribed endpoint times. Target range must be determined from the bearing data and, depending upon the geometry applied to collect the data, can be weakly observable. Hence, $\overline{x}_w = [R_1, R_2]$ denotes the weakly observable component of the state vector that is sampled over the $R_1, R_2$ grid associated with the PEP. When the bearing tiedowns are optimized for each sample $\overline{x}_w^k$, a distinct set of bearing tiedowns may be calculated for each $R_1, R_2$ grid point. Our approach to improved uncertainty representation in this endpoint range space is to apply these distinct values in the calculation of the PEP RMS cost function that is displayed.

Figure 4:
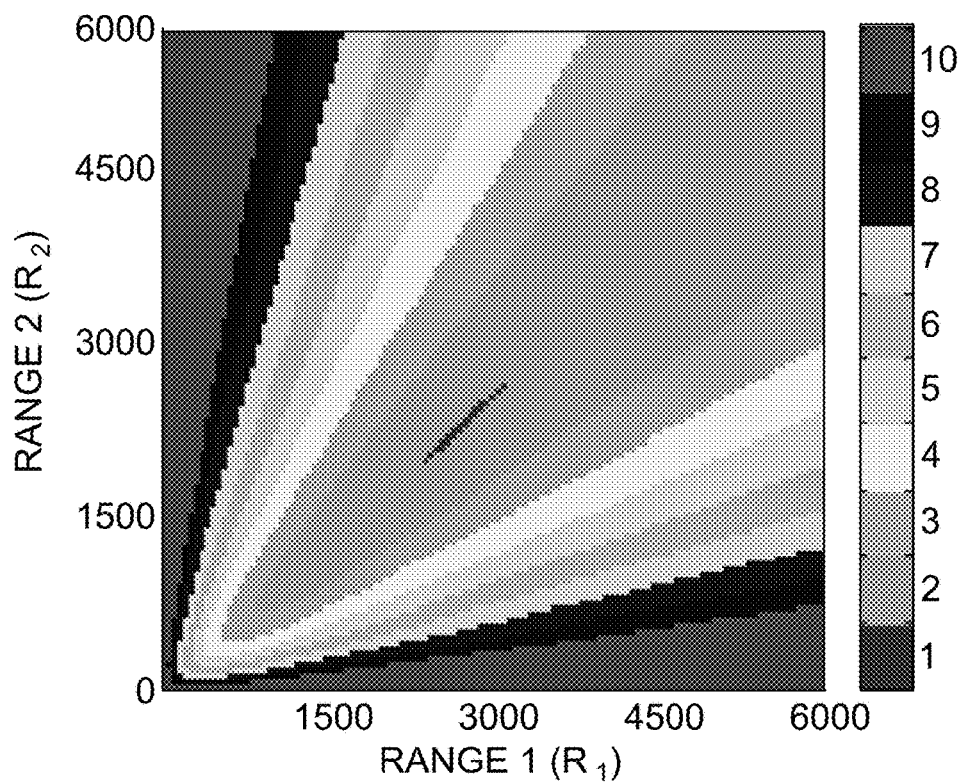
FIG. 4. is a graph showing the cost function related to the initial range and the final range.

The approach above improves on the typical grid approach to displaying uncertainty in that refinement in the observed parameters gives a more informative slice of the total state space uncertainty. The method herein gives a more robust representation of the range parameters than in the case of the PEP surface shown in FIG. 4. Once the subspace likelihood has been expanded to its plausible extent via maximum likelihood estimation of $\tilde{x}$, the parametric uncertainty can be projected to any other subspace of interest.

Computational efficiency is obtained by noting that not all the grid points yield the same impact on the uncertainty representation. It is inefficient to iterate extensively in order to fit the best observed parameters for each grid point independent of their contribution to the uncertainty representation. $R_1, R_2$ grid points that correspond to implausible or unlikely tracks will have little impact on the overall uncertainty representation. To address this, each step in the estimation process is performed simultaneously for each sampled grid point. At each iteration in the estimation process, the likelihood function that is produced over the weak state subspace $S_w$ given the current iteration is calculated and compared to that attained in the previous iteration. The quantitative measure employed for this comparison is the Kullback-Leibler divergence. It is known in many information theoretic and statistical estimation contexts. If the difference in the measure over the $R_1, R_2$ grid is significant, the iterative estimation process is allowed to continue. If it is not, the process is terminated thereby saving many iteration calculations that might be executed at sampled values with a poor goodness-of-fit measure.

This approach has two by-products. One is that it provides a completely parallel process of iterations over the grid. This promotes computational savings as parallelization methods become more mature in software development products. Secondly, it has the effect of drastically reducing the total iterations required since tracks (grid points) which do not significantly impact the uncertainty representation can be stopped prior to achieving a local minimum. That is, unnecessary computation is not utilized to calculate implausible tracks.

This method incorporates all the aspects described above with some very important extensions. As mentioned above, the state vector is partitioned into two components governed by how strongly or weakly the component vectors are. For the weakly observable components, an ensemble of samples is methodically drawn over the weak parameter subspace. With augmentation by the strong component for each track, an ensemble of feasible tracks is developed. The strong set parameters are estimated using the standard estimation methods to maximize the plausibility of the weak set. In developing the strong set parameters using gradient based methods, the calculation of gradients is extended from a two dimensional array over the measurement set and the states of the parameter estimate to a three dimensional matrix formulation spanning the set of tracks included in the methodical grid sampling as well as the measurement set and state variable components.

In this extension, A, now denotes a (K×M×N) gradient matrix of partial derivatives. This gradient matrix can be formulated such that each row corresponds to a track index k, each column corresponds to a measurement index, m. Each sheet is associated with the single component, $\tilde{x}(n)$, of the state variable $\tilde{x}$. Each gradient sheet comprises the subset of gradients, $$A_n = \left[\frac{\partial z_m(\tilde{x}, \bar{x}_w^k)}{\partial \tilde{x}(n)}\right], \quad (17)$$

with $A_n = A(:,:,n)$. The track parameter index n, varies orthogonally to the sheets. Following equation 15, the gradients for the PEP endpoint bearings are calculated for each bearing measurement $B_m$ and track combination $\bar{x}_w^k$ as:

$$\frac{\partial B_m}{\partial B_1} = (R_1^k \cos(B_1) \Delta T_2 r_y^k(t_m) + R_1^k \sin(B_1) \Delta T_2 r_x^k(t_m))/r^k(t_m) \quad (18)$$

$$\frac{\partial B_m}{\partial B_2} = (R_2^k \cos(B_2) \Delta T_1 r_y^k(t_m) + R_2^k \sin(B_2) \Delta T_1 r_x^k(t_m))/r^k(t_m) \quad (19)$$

where $r_x(t_m)$ and $r_y(t_m)$ are calculated as:

$$r_x^k(t_m) = \Delta T_1 R_1^k \sin(B_1) + \Delta T_2 R_2^k \sin(B_2) + \Delta x_0(t_m) \quad (20)$$

$$r_y^k(t_m) = \Delta T_1 R_1^k \cos(B_1) + \Delta T_2 R_2^k \cos(B_2) + \Delta y_0(t_m) \quad (21)$$

following equations 11 and 12 with range at time $t_m$ for track k given by:

$$r^k(t_m) = \sqrt{r_x^k(t_m)^2 + r_y^k(t_m)^2} \quad (22)$$

Note that the observer trajectory deviations, $\Delta x_0(t_m)$ and $\Delta y_0(t_m)$ are identical for each track k.

When the Householder transformation is applied to this construct, it is calculated in parallel over the track set $\{\bar{x}_w^k\}_{k=1}^K$. The vectorised Householder is applied sequentially over the N sheets associated with $\tilde{x}$. Following equations 6 and 10 and using a step-size of unity (s=1 in equation 6), the transformation operates over the measurement set to yield the vectorised back substitution:

$$g_i^k = (R^k)^{-1} \tilde{Z}_e^k \quad (23)$$

for k=1, . . . K.

The second significant extension is to control the iteration process over which the method converges to the optimal solution set. To do this, the method measures the change in information that is gained over the weak observability parameter subspace, $S_w$, each time that a set of track parameters are updated. During each iteration, an estimate, $\hat{x}^k$, of the parameters in $\tilde{x}^k$ that are associated with track k are updated according to $$\hat{x}_{i+1}^k = \hat{x}_i^k + g_i^k, k=1, \ldots, K \quad (24)$$

The resulting likelihood function developed over the subspace $S_w$ to a conditional probability density function $f_i(k)$ by assuming a diffuse prior over $S_w$ and normalizing the result such that $$\sum_{k=1}^K f_i(k) = 1.$$

$$f_i(k) = \frac{e^{-\frac{1}{\sigma^2} J(\hat{x}_i^k)}}{\sum_{k=1}^K e^{-\frac{1}{\sigma^2} J(\hat{x}_i^k)}} \quad (25)$$

The Kullback-Leibler divergence is then calculated between the probability density function produced in the preceding iteration, $f_i$, and its update following the iteration, $f_i+1$.

The Kullback-Leibler divergence is computed as:

$$D(f_i(k) \mid f_{i+1}(k)) = \sum_{k=1}^{K} f_i(k) \log_K \left( \frac{f_i(k)}{f_{i+1}(k)} \right) \quad (26)$$

When the change in information falls below a specified threshold, $$D(f_i(k)|f_{i+1}(k)) < \epsilon, \quad (27)$$

the iteration is halted. The information measure is developed following Shannon's practice of applying the logarithm base equal to the size of the input alphabet to avoid scaling issues. This does not pose difficulty as any base logarithm can be applied; that is $\log_a(p) = \log_b(p)/\log_b(a)$. The equivalent termination criterion using a logarithmic base of 2 becomes $$D(f_i(k) \mid f_{i+1}(k)) = \log_2\left(\frac{\alpha_{i+1}}{\alpha_i}\right) + \alpha_0 \sum_{k=1}^{K} f_i(k)\left(J(\hat{x}_{i+1}^k) - J(\hat{x}_i^k)\right) < \epsilon \log_2 K \quad (28)$$

where $$\alpha_i = \sum_{k=1}^{K} e^{-\frac{1}{\sigma^2} J(\hat{x}_i^k)} \quad (29)$$

$$\alpha_{i+1} = \sum_{k=1}^{K} e^{-\frac{1}{\sigma^2} J(\hat{x}_{i+1}^k)} \quad (30)$$

$$\alpha_0 = 0.5 \frac{\log_2(e)}{\sigma^2} \quad (31)$$

With this approach, a fixed termination criterion can be applied. The value of $\epsilon = 0.001$.

A functional diagram of the invention is provided in FIG. 5. This diagram illustrates the dichotomy that is created between the strongly and weakly observable state components. In the current embodiment bearings are strongly observable state components and ranges are weakly observable state components; however, other strongly and weakly observable state components can be used. Signal strength could be an additional strongly observed component. An example of an additional weakly observable component is target velocity.

Figure 1:
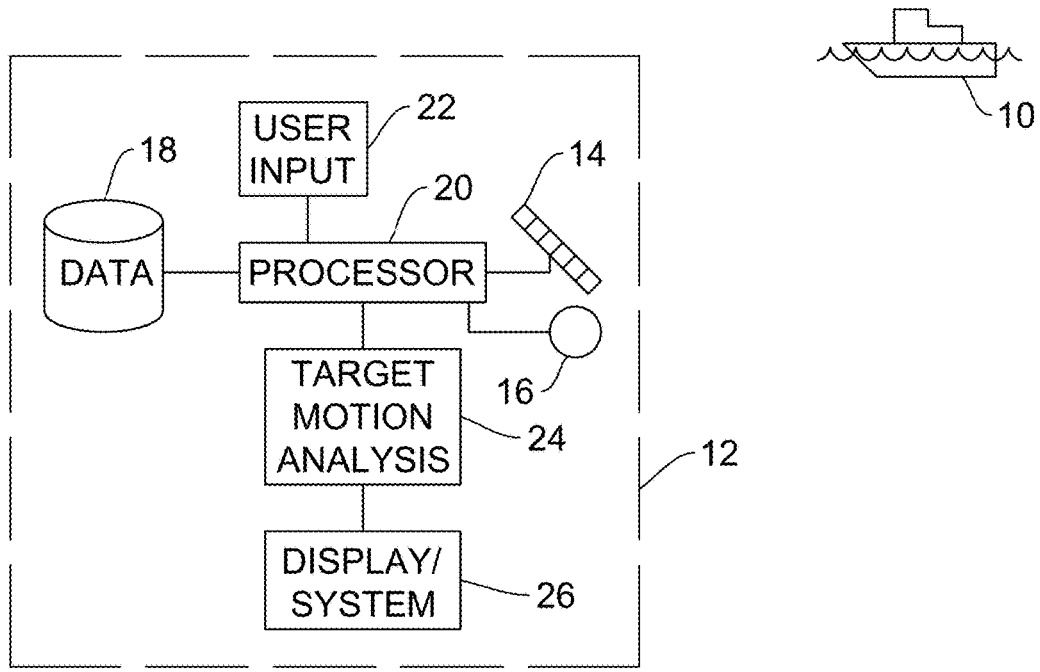
FIG. 1 is a diagram of a typical target motion analysis system.
Figure 2:
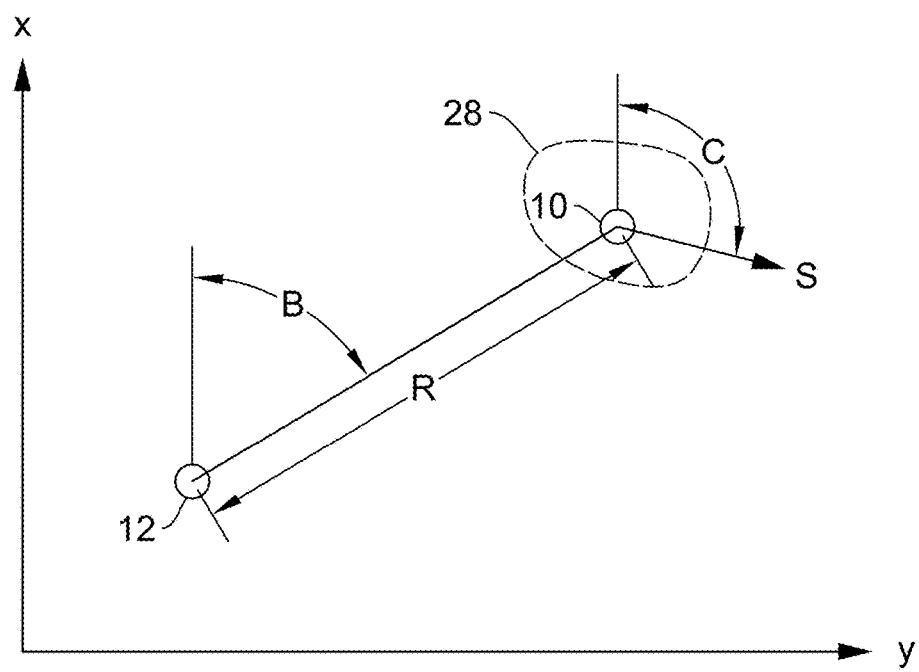
FIG. 2 is a graph showing target motion analysis parameters.
Figure 3:
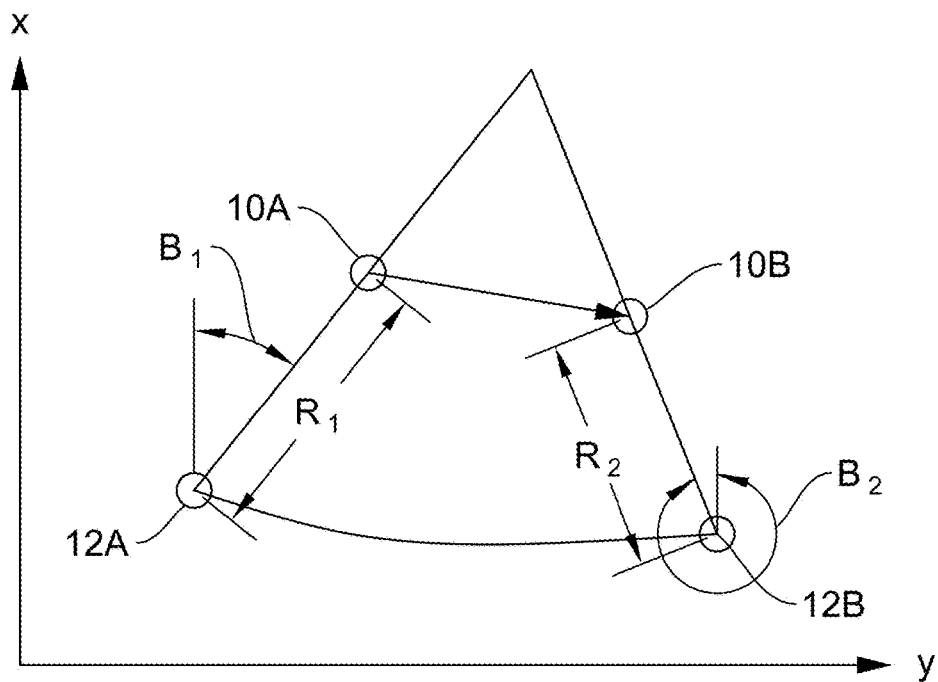
FIG. 3 is another graph showing target motion analysis as the observer and target move through time.

In FIG. 5 step 30 these strongly and weakly observable components are received at the target motion analysis system 24 from a processor such as 20 of FIG. 1. In step 32 the weakly observable components $S_w$ are utilized to form an analysis grid that can be used for parallelizing computation. Strongly observed components $S_s$ are initialized to initial conditions in step 34. In step 36 the initial $S_s$ vectors, $S_w$ analysis grid, and $S_w$ values are used to calculate initial $S_w$ probability density functions.

Dashed region 38 represents computations that are performed over the analysis grid formed from the weakly observable components $S_w$ in step 32. (Of course these computations can also occur sequentially.) Calculation of strongly observable component gradients is performed in step 40. This step utilizes equation (17) discussed above. Step 42 calculates direction of the strong updates utilizing the vectorized Householder transformation and back-substitution as provided in equation (22). The $S_s$ vectors are updated in step 44 according to equation (23).

After completion of the $S_w$ grid calculations of 38, the method determines if calculations are converging to an optimal solution set. In step 46, the $S_w$ probability density functions are updated in accordance with equation (24). Step 48 calculates the Kullback-Liebler divergence between the $S_w$ probability density functions from the prior step and those of the current step to determine the change in information over the weakly observable data subspace. This change in information is compared against a threshold $\epsilon$ in step 50. (The threshold can be either calculated or pre-established in accordance with pre-established tolerances as discussed above related to equation (27)-(31).) If the change in information is above the threshold $\epsilon$, updated parameters are provided to the parallelized routines 38 in step 52 for additional iterative computation. If the change in information falls below the threshold $\epsilon$ the $S_s$ vectors and $S_w$ likelihood are provided as output in step 54.

Figure 6A:
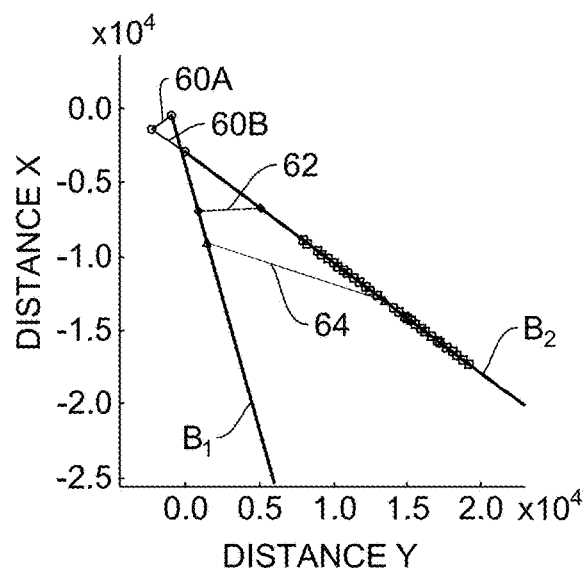
FIGS. 6A and 6B are graphs showing target motion analysis under the prior art method.
Figure 6B:
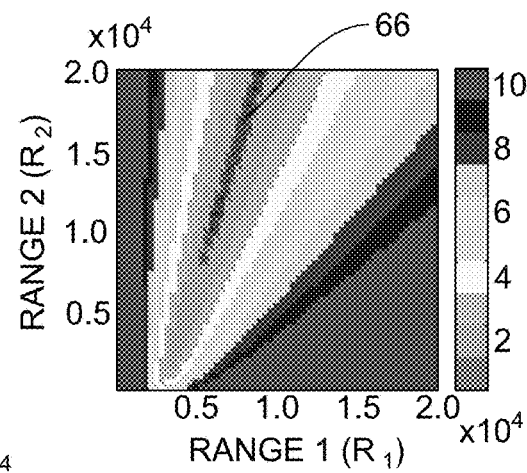
Figure 7A:
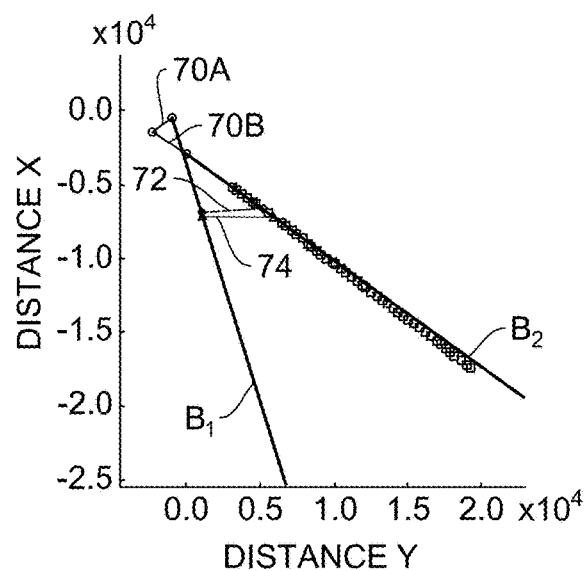
FIGS. 7A and 7B are graphs showing target motion analysis under the current method.
Figure 7B:
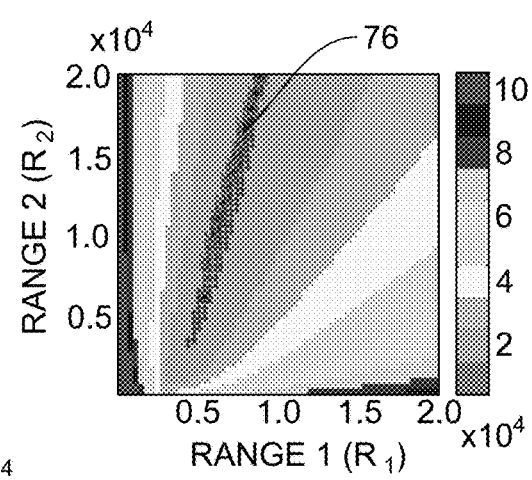

An illustration of the impact of the invention is provided in FIGS. 6A, 6B, 7A, and 7B. Here, the method is applied to perform smoothing of the endpoint bearings over the estimated $R_1$, $R_2$ grid and to construct the area of uncertainty in geographic coordinates. FIGS. 6A and 7A provide a geographic display of observer and target tracks for a bearings only target motion analysis example. The observer trajectory consists of two legs identified as 60A and 60B in FIG. 6A and as 70A and 70B in FIG. 7A. Endpoint bearings $B_1$ and $B_2$ emanate from the terminal points of the observer trajectory. The true target track is shown as 62 in FIG. 6A and as 72 in FIG. 7A. FIGS. 6B and 7B provide an illustration of the RMS cost surface developed as a function of the endpoint ranges. The minimal cost region 66 shows up as the long slightly tilted region comprised by the collection of 'x's at the center of the fan of expanding wedges. FIGS. 6A and 6B illustrate the result obtained prior to application of the method where bearings are tied down arbitrarily. The minimum RMS solution is indicated as track line 64 that broaches the endpoint bearings in the geometry plot. The corresponding AOU is illustrated as the set of squares on the second bearing line $B_2$. FIG. 7A illustrates the impact of the method. Once the current method has calculated the endpoint bearings at each track point (i.e., each range 1 and range 2 node within the range grid), the set of points in each of the RMS shading bands expands to provide a more accurate depiction of the uncertainty in the range estimates. The improvement in the estimated target track 74 due to the endpoint smoothing is evident in the figure. Also note that each successive sensitivity level has increased in size. The inner region identified by squares comprising the AOU is shown to include the true target track whereas in FIG. 6A, it did not. In FIG. 7B, the minimal cost region is indicated by reference number 76.

The utilization of this method has several advantages over traditional data processing methods. By constructing the track-measurement-parameter multi-dimensional array, vectorized numerical operations can be applied over the ensemble of candidate target tracks to increase the efficiency of the algorithm. By decomposing the target state vector into strongly and weakly observable components, the sensitivity of the objective function to additional modeling parameters can be evaluated by adjoining these parameters to the strong state components and applying gradient based estimation methods. By devising an estimation termination criteria that measures the change of information content over the weakly observable parameter subspace, parameter estimation is allowed to converge only for those track candidates that actually influence the determination of the uncertainty region boundary.

The current method allows a more robust uncertainty representation with a reasonable computational burden. The novelty here is in the fact that maximum likelihood estimation is applied simultaneously to the collection of feasible tracks rather than individually to each track with no regard to convergence properties for the track. This significantly expedites the convergence of the overall algorithm.

It will be understood that many additional changes in the details, materials, steps and arrangement of parts, which have been herein described and illustrated in order to explain the nature of the invention, may be made by those skilled in the art within the principle and scope of the invention as expressed in the appended claims.

The foregoing description of the preferred embodiments of the invention has been presented for purposes of illustration and description only. It is not intended to be exhaustive, nor to limit the invention to the precise form disclosed; and obviously, many modification and variations are possible in light of the above teaching. Such modifications and variations that may be apparent to a person skilled in the art are intended to be included within the scope of this invention as defined by the accompanying claims.

What is claimed is:

1. A method for target motion analysis for a system providing strongly observable state components and weakly observable state components related to an observer and a target comprising the steps of:
   initializing strongly observable state components into strong state vectors;
   utilizing weakly observable state components to form a weak state analysis grid having a plurality of nodes;
   calculating initial weak state probability density functions from the strong state vectors, weak state analysis grid, and weakly observable state components;
   calculating strong state gradients associated with the strong state vectors for each node of the weak state analysis grid;
   calculating direction of a target track of the strong state vectors from the calculated strong state gradients utilizing the vectorized Householder transformation and back-substitution for nodes of the weak state analysis grid;
   updating the strong state vectors utilizing the updates obtained from the vectorized Householder transformation and back-substitution calculation directly for nodes of the weak state analysis grid;
   updating the weak state probability density functions from the updated strong state vectors, weak state analysis grid, and weakly observable state components;
   establishing an information threshold based on change in information related to the updated weak state probability density functions and the previous weak state probability density functions;
   determining if the updated weak state probability density functions when compared with the previous weak state probability density functions exceed the information threshold;
   recalculating the steps of calculating strong state gradients, calculating direction, updating the strong state vectors for nodes of the weak state analysis grid, and updating the weak state probability density functions if the information threshold is exceeded; and
   providing the strong state vectors and weak state probability density functions as output if the information threshold is not exceeded.

2. The method of claim 1 wherein the change in information over the weak state analysis grid is calculated utilizing the Kullback-Leibler divergence.

3. The method of claim 1 wherein the steps of calculating strong state gradients, calculating direction, and updating the strong state vectors are parallelized utilizing the weak state analysis grid.

4. The method of claim 1 wherein the steps of calculating strong state gradients, calculating direction, and updating the strong state vectors are calculated iteratively utilizing the weak state analysis grid.

5. The method of claim 1 wherein:
   strongly observable state components include bearings from the observer to the target; and
   weakly observable state components include ranges from the observer to the target.

6. The method of claim 5 wherein weakly observable state components further include target velocity.

* * * * *